(12) United States Patent
Mitsuoka et al.

(10) Patent No.: US 9,461,301 B2
(45) Date of Patent: Oct. 4, 2016

(54) LITHIUM-AIR BATTERY AND LITHIUM ANODE COMPOSITE THEREOF

(71) Applicant: SUZUKI MOTOR CORPORATION, Shizuoka-Ken (JP)

(72) Inventors: Shigehi Mitsuoka, Shizuoka-Ken (JP); Ryo Komatsu, Shizuoka-Ken (JP); Hiroaki Izumi, Shizuoka-Ken (JP); Khalilur Rahman, Shizuoka-Ken (JP)

(73) Assignee: SUZUKI MOTOR CORPORATION, Shizuoka-Ken (JP)

( * ) Notice: Subject to any disclaimer, the term of this patent is extended or adjusted under 35 U.S.C. 154(b) by 464 days.

(21) Appl. No.: 14/103,944

(22) Filed: Dec. 12, 2013

(65) Prior Publication Data

US 2014/0178776 A1   Jun. 26, 2014

(30) Foreign Application Priority Data

Dec. 20, 2012   (JP) .................................. 2012-278367

(51) Int. Cl.

| H01M 4/36 | (2006.01) |
|---|---|
| H01M 4/134 | (2010.01) |
| H01M 12/06 | (2006.01) |
| H01M 2/02 | (2006.01) |
| H01M 2/18 | (2006.01) |
| H01M 2/38 | (2006.01) |
| H01M 12/08 | (2006.01) |
| H01M 2/16 | (2006.01) |
| H01M 4/66 | (2006.01) |

(52) U.S. Cl.
CPC ........... *H01M 4/134* (2013.01); *H01M 2/0255* (2013.01); *H01M 2/1686* (2013.01); *H01M 2/18* (2013.01); *H01M 2/38* (2013.01); *H01M 4/366* (2013.01); *H01M 12/065* (2013.01); *H01M 12/08* (2013.01); *H01M 2/166* (2013.01); *H01M 4/661* (2013.01); *H01M 2300/0065* (2013.01); *H01M 2300/0094* (2013.01); *Y02E 60/122* (2013.01)

(58) Field of Classification Search
CPC .................. H01M 2300/0094; H01M 12/065; H01M 4/366
See application file for complete search history.

(56) References Cited

U.S. PATENT DOCUMENTS

2010/0266901 A1   10/2010   Johnson

FOREIGN PATENT DOCUMENTS

| CN | 102723539 A | 10/2012 |
|---|---|---|
| JP | 2010192313 A | 9/2010 |
| JP | 2012-113993 A | 6/2012 |
| JP | 2012-138290 A | 7/2012 |
| WO | 2012061817 A1 | 5/2012 |

OTHER PUBLICATIONS

Office Action to corresponding Japanese Patent Application No. JP 2012-278367; dated May 31, 2016.

*Primary Examiner* — Jane Rhee
(74) *Attorney, Agent, or Firm* — Barnes & Thornburg LLP

(57) ABSTRACT

A lithium-air battery having a lithium anode composite and an air electrode. The lithium anode composite includes a plate-shaped or strip-shaped anode current collector; two plate-shaped anode layers made from metallic lithium, an alloy primarily composed of lithium, or a compound primarily composed of lithium and arranged to sandwich a part of the anode current collector; two plate-shaped isolating layers made from glass ceramics having lithium ion conductivity and arranged to sandwich another part of the anode current collector and the whole of the two anode layers; and a junction provided to join and close outer peripheral portions of the two isolating layers with rest of the anode current collector being exposed outward between the two isolating layers. The air electrode includes an air electrode layer having an electroconductive material and a plate-shaped or strip-shaped air electrode current collector electrically connected to the air electrode layer.

11 Claims, 5 Drawing Sheets

LITHIUM-AIR BATTERY AND LITHIUM ANODE COMPOSITE THEREOF

PRIORITY CLAIM

This patent application claims priority to Japanese Patent Application No. 2012-278367, filed 20 Dec. 2012, the disclosure of which is incorporated herein by reference in its entirety.

BACKGROUND OF THE INVENTION

1. Field of the Invention

The present invention relates to a lithium-air battery and a lithium anode composite of the lithium-air battery.

2. Related Art

In anticipation of the popularization of electric vehicles, an air battery having an energy density far higher than that of a lithium-ion battery is expected to be developed. The air battery uses oxygen in the air as an active material for cathode.

Incidentally, there is known a lithium-air battery using metallic lithium, an alloy composed primarily of lithium, or a compound composed primarily of lithium for an active material for anode. When attention is focused on the types of electrolytes, the lithium-air battery is roughly classified into an aqueous electrolyte type and a nonaqueous electrolyte type. A nonaqueous electrolyte type lithium-air battery is a mainstream of research and development since lithium-ion battery technologies, except an air electrode, can be utilized for the lithium-air battery.

On the other hand, research and development, though small in the number of instances, is also being conducted on an aqueous electrolyte type lithium-air battery. The aqueous electrolyte type lithium-air battery has such advantages that the battery is insensitive to airborne moisture and the electrolyte is inexpensive and nonflammable, compared with the nonaqueous electrolyte type lithium-air battery. Metallic lithium which is an anode active material reacts with oxygen and water, however, if the metallic lithium is brought into direct contact therewith. Accordingly, the aqueous electrolyte type lithium-air battery has to be provided with a protective layer of a polymer electrolyte, a lithium ion-conducting solid electrolyte, or the like, in order to protect metallic lithium against the atmosphere and an aqueous solution.

Hence, there has been proposed a lithium-air battery provided with an anode composite in which a buffer layer of a polymer electrolyte is formed on one surface of plate-shaped metallic lithium, and one surface of the polymer electrolyte buffer layer is covered with glass ceramics having lithium ion conductivity and serving as a water-resistant layer (see, for example, Patent Document 1 (Japanese Patent Laid-Open No. 2010-192313) and Non-Patent Document 1 ("Present Status and Issues for Lithium/Air Battery Using Aqueous Electrolyte," by Yasuo Takeda, Nobuyuki Imanishi, Osamu Yamamoto; GS Yuasa Technical Report, Vol. 7, No. 1, pp. 1-6 (June, 2010)).

The conventional air battery described in Patent Document 1 or Non-Patent Document 1 is sealed in a container or a laminate film with one surface of a single air electrode directly facing one surface of a single anode composite. In such conventional air batteries, when it is required to increase an input/output density (output per weight), a number of air batteries having the same structure is simply used, or an air battery is simply upsized with the structure thereof unchanged.

However, the mode of simply using a number of air batteries having the same structure or simply upsizing an air battery with the structure unchanged, the mounting space of the air battery or batteries is inefficiently and significantly increased. Therefore, such mode is impractical where the air battery or batteries are mounted on an electric vehicle, for example.

Furthermore, in the air battery described in the above-mentioned Non-Patent Document 1, an anode composite is sealed or enclosed in a gas-barrier laminate film having a trilaminar structure composed of polypropylene (PP), aluminum foil and polyethylene terephthalate (PET). Moreover, in order to secure lithium ion conductivity inside and outside the laminate film, the anode composite of the Non-Patent Document 1 is configured such that openings created in the laminate film are plugged up with glass ceramics serving as a lithium ion-conducting window material.

It is, however, difficult to bond the polypropylene (PP) of the laminate film and the glass ceramics of the anode composite to each other with an adhesive agent, thus resulting in the lack of durability. In addition, in order to heat-weld the laminate film to form the anode composite, a welding margin of approximately 10 mm is required in an outer peripheral portion of the laminate film. This requirement results in an expansion in the area of the laminate film and an increase in the volume of the air battery, thus being inconvenient.

That is, the conventional air battery is for the purpose of providing an experimental small-sized unit cell, and it is therefore difficult to configure a compact practical cell having increased battery characteristics, in particular, an energy density.

SUMMARY OF THE INVENTION

Hence, it is an object of the present invention to provide a compact lithium-air battery capable of preventing the lithium-air battery from being extremely increased in size in comparison with a conventional air battery, even if an energy density and an input/output density are increased.

Another object of the present invention is to provide a lithium anode composite of the lithium-air battery, which may be called merely anode composite hereafter.

The above and other objects can be achieved according to the present invention by providing, in one aspect, a lithium-air battery comprising: a lithium anode composite; and an air electrode, wherein the lithium anode composite includes: a plate-shaped or strip-shaped anode current collector; two plate-shaped anode layers made from metallic lithium, an alloy primarily composed of lithium, or a compound primarily composed of lithium and arranged so as to sandwich a part of the anode current collector; two plate-shaped isolating layers made from glass ceramics having lithium ion conductivity and arranged so as to sandwich another part of the anode current collector and the whole of the two anode layers; and a junction provided so as to join and close outer peripheral portions of the two isolating layers with rest of the anode current collector being exposed outward between the two isolating layers, and wherein the air electrode includes: an air electrode layer containing an electroconductive material and facing at least one of the two isolating layers; and a plate-shaped or strip-shaped air electrode current collector electrically connected to the air electrode layer.

The following preferred exemplary modes of the above aspect may be provided.

The air electrode may include a further air electrode layer containing an electroconductive material and electrically connected to the first-mentioned air electrode layer while being opposed to another one of the two isolating layers.

It may be preferred that a plurality of the lithium anode composites and a plurality of air electrodes are alternately overlapped with one another to be stacked and electrically connected in parallel with one another.

The air electrode layer may be folded in a zigzag manner, and each of the plurality of anode composites is sandwiched by planar portions each of which is located between folding lines of the air electrode layer.

The lithium-air battery may further includes a case in which the lithium anode composites and the air electrodes are arranged, and an electrolyte is stored within the case in contact with at least the air electrodes to undertake lithium ion conduction between the air electrodes and the anode composites. In this arrangement, the case may be a molded component made from a gas-permeable but liquid-impermeable material. Only the anode current collector and the air electrode current collector may be exposed on the outer side of the case.

It may be also preferred that the anode current collector is made from one of copper, gold and platinum.

It may be also preferred that the air electrode current collector is made from one of aluminum, gold and platinum.

It may be also preferred that the air electrode layer is made from one of carbon cloth and carbon nonwoven cloth.

In another aspect of the present invention, there is provided a lithium anode composite of a lithium-air battery including: a plate-shaped or strip-shaped anode current collector; two plate-shaped anode layers made from metallic lithium, an alloy composed primarily of lithium, or a compound primarily composed of lithium and arranged so as to sandwich a part of the anode current collector; two plate-shaped isolating layers made from glass ceramics having lithium ion conductivity and arranged so as to sandwich another part of the anode current collector and the whole of the two anode layers; and a junction portion provided so as to join and close outer peripheral portions of the two isolating layers with rest of the anode current collector being exposed outward between the two isolating layers.

According to the present invention of the characters mentioned above, it is possible to provide a compact lithium-air battery capable of preventing an extreme increase in the size thereof, compared with a conventional air battery, even if an energy density and an input/output density are increased. It is also possible to provide a lithium anode composite of the lithium-air battery.

The other characteristic features and advantageous effects attainable thereby according to the present invention will be described and made clearer hereinafter with reference to the accompanying drawings.

DESCRIPTION OF THE PREFERRED EMBODIMENT

Hereunder, embodiments of a lithium-air battery and a lithium anode composite of the lithium-air battery according to the present invention will be described with reference to FIGS. 1 to 6.

In the following disclosure of the embodiments, it is to be noted that the lithium anode composite of the present embodiment may be called merely "anode composite" or "protected lithium anode composite" in consideration of the structural configuration or nature thereof.

Figure 1:
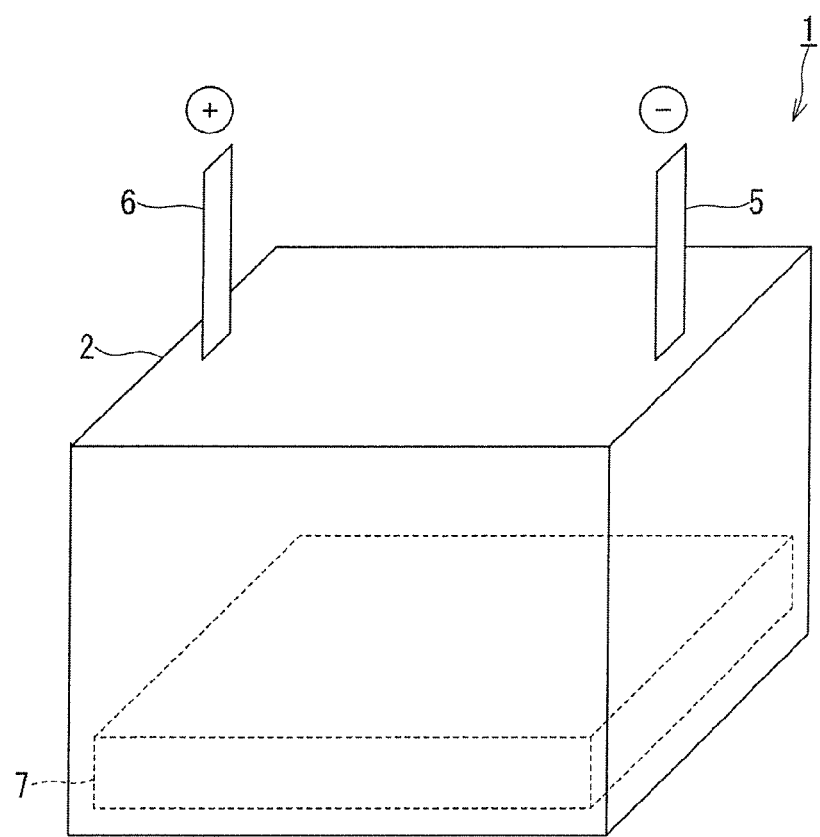
FIG. 1 is a schematic perspective view illustrating one example of a lithium-air battery according to an embodiment of the present invention.

FIG. 1 is a schematic perspective view of a lithium-air battery according to one embodiment of the present invention.

A lithium-air battery 1 is a battery performing electricity charge/discharge function, and as illustrated in FIG. 1, the lithium-air battery 1 according to the present embodiment comprises a case 2 serving as an outer shell, an anode current collector 5 led out from the inside of the case 2 to be exposed, and an air electrode current collector 6 serving as a cathode current collector.

The case 2 is a molded component made from a gas-permeable but liquid-impermeable material, such as polyethylene or Gore-Tex (Registered Trademark), and is a hollow body having a hexahedral shape, for example, a rectangular solid shape. The case 2 may alternatively be a molded component made from a gas-impermeable and liquid-impermeable material. In this case, vent holes are provided on sidewalls of the case 2, in which the vent holes are located at positions where a later-described electrolyte 7 is not allowed to leak out so as to circulate air into and out of the case.

Only the anode current collector 5 and the air electrode current collector 6 are exposed on the outer side of the case 2.

Figure 2:
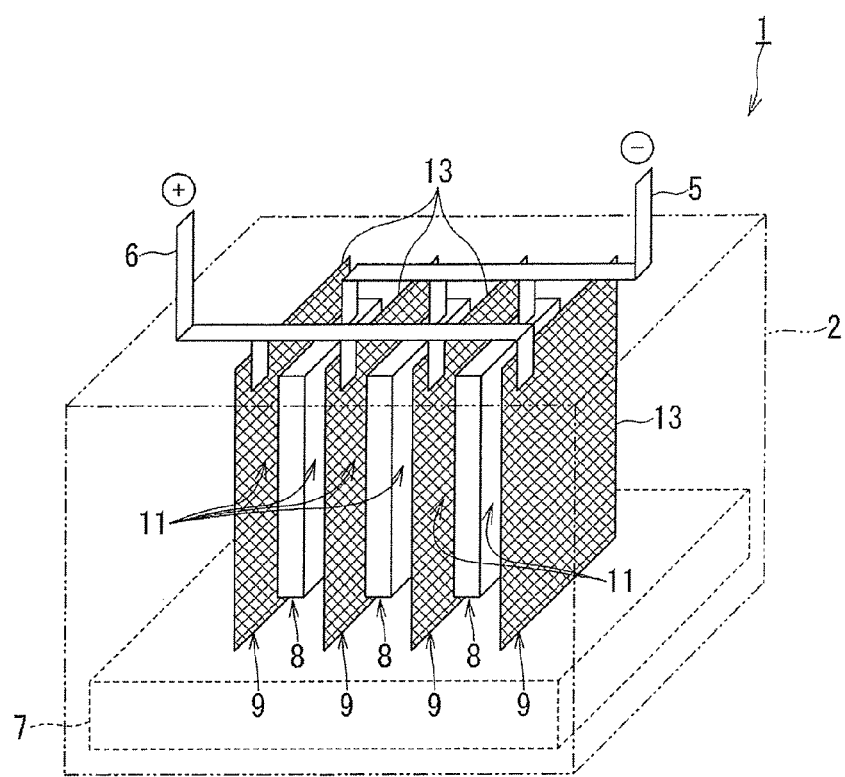
FIG. 2 is a schematic perspective view showing an internal structure of the lithium-air battery according to the embodiment of the present invention.
Figure 3:
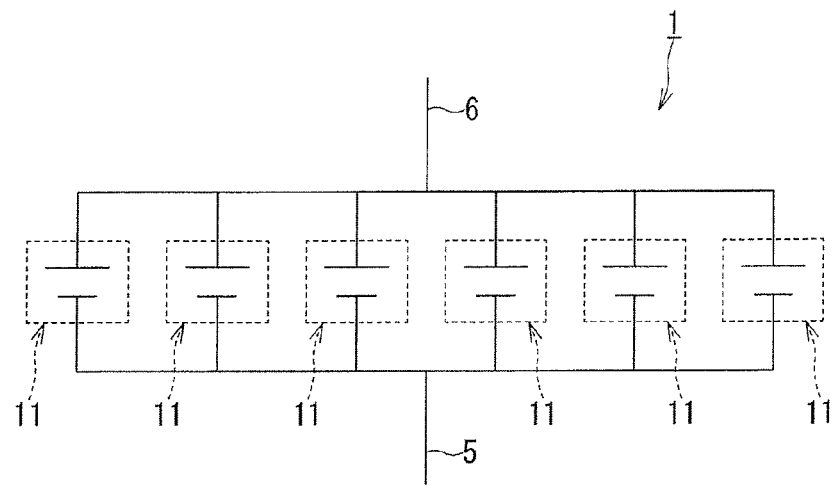
FIG. 3 is a circuit diagram illustrating the lithium-air battery according to the embodiment of the present invention.

FIG. 2 is a schematic perspective view of an internal structure of the lithium-air battery according to the embodiment of the present invention, and FIG. 3 is a circuit diagram illustrating the lithium-air battery thereof.

It is further to be noted that a lithium anode composite 8 and an air electrode 9 adjacent to each other are in practice in contact with each other. In FIG. 2, however, the adjacent lithium anode composite 8 and air electrode are shown in a manner of being separated from each other for the sake of ease distinction and understanding.

As illustrated in FIGS. 2 and 3, the lithium-air battery 1 according to the present embodiment comprises a case 2 for housing a plurality of protected lithium anode composites (anode composites) 8 and a plurality of air electrodes 9, which are arranged in a fashion of being alternately overlapped and stacked with one another, and an electrolyte 7 stored within the case 2 in contact with at least the air electrodes 9 so as to undertake lithium ion conduction between the air electrodes 9 and the anode composites 8.

One surface of each anode composite 8 and one surface of each air electrode 9 confronting such anode composite surface constitute one air battery cell 11. In other words, the lithium-air battery 1 has parallel-connected air battery cells 11 as many as the number of places at which the anode composites 8 and the air electrodes 9 confront one another.

The plurality of anode composites 8 and the plurality of air electrodes 9 have plate-like shapes, respectively. In addition, the plurality of anode composites 8 and the plurality of air electrodes 9 are electrically connected in parallel, respectively.

Each air electrode 9 is larger in projected area than each anode composite 8, and more specifically, each air electrode 9 has a quadrangular shape relatively larger than the quadrangular flat plate-shaped shape of each anode composite 8.

Each air electrode 9 includes an air electrode layer 13 containing an electroconductive material and facing at least one of each anode composite 8 (i.e., one surface of each isolating layer 12 to be described later), and a plate-shaped or strip-shaped air electrode current collector 6 electrically connected to the air electrode layer 13.

The air electrode layers 13 are made of an electrical conductor, such as carbon fiber and have a thin plate-shaped shape. Specifically, the air electrode layers 13 are made from carbon cloth or carbon nonwoven cloth. Each air electrode layer 13 sucks up the electrolyte 7 utilizing a capillary phenomenon so as to interpose the electrolyte between each anode composite 8 and each air electrode 9.

The air electrode current collector 6 is an electrical conductor made from aluminum, gold or platinum. The electrolyte 7 is an aqueous electrolytic solution and may be in contact with the anode composites 8.

Alternatively, the electrolyte 7 may be a polymer electrolyte. In this case, the electrolyte 7 may be either a thin film-like body sandwiched between an air electrode 9 and a anode composite 8, or a membranous body with which a surface of each air electrode layer 13 is coated.

Figure 4:
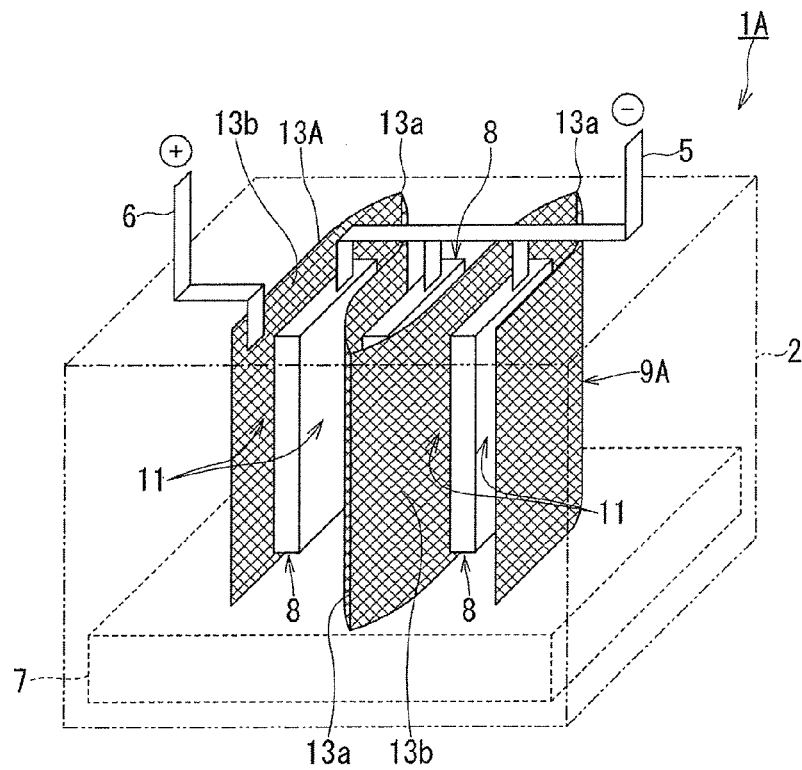
FIG. 4 is a schematic perspective view illustrating another example of an internal structure of the lithium-air battery according to the embodiment of the present invention.

FIG. 4 is a schematic perspective view illustrating another example of the internal structure of the lithium-air battery according to the embodiment of the present invention, like the example shown in FIG. 2.

Further, in this example, a protected lithium anode composite (may be called merely anode composite) 8 and an air electrode 9A adjacent to each other are in practice in contact with each other. In FIG. 4, however, the adjacent anode composite 8 and air electrode are shown as being separated from each other for the sake of ease distinction and understanding.

It is also noted that components constituting a lithium-air battery 1A identical to those of the lithium-air battery 1 are denoted by the same reference numerals and will not be discussed again here.

As illustrated in FIG. 4, an air electrode layer 13A included in an air electrode 9A of the lithium-air battery 1A according to the present embodiment is folded in a zigzag manner. Each of a plurality of anode composites 8 is sandwiched by planar portions 13b each of which is located between folding lines 13a of the air electrode layer 13A.

Only one air electrode current collector 6 should be provided for one air electrode layer 13A in which the plurality of anode composites 8 are interposed. Thus, the air electrode current collector 6 of the lithium-air battery 1A can be decreased in overall length, weight, and volume than the air electrode current collector 6 of the lithium-air battery 1 of the embodiment represented by FIG. 2.

Figure 5:
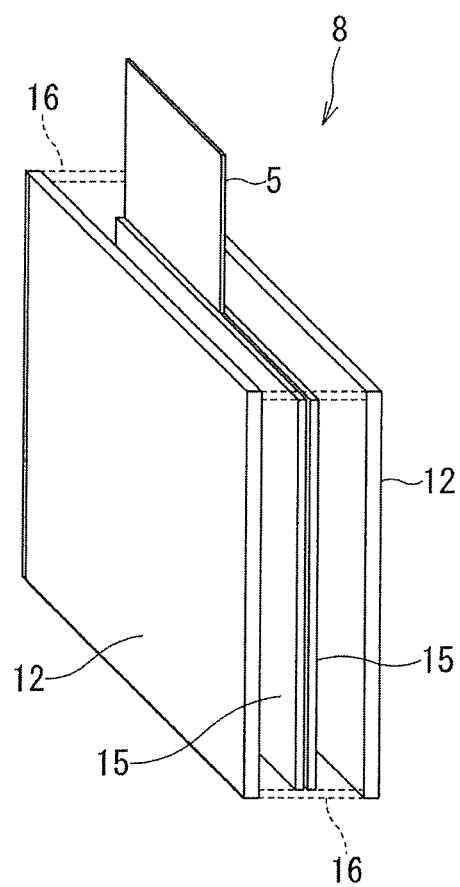
FIG. 5 is a schematic perspective view illustrating a lithium anode composite of the lithium-air battery according to another embodiment of the present invention.
Figure 6:
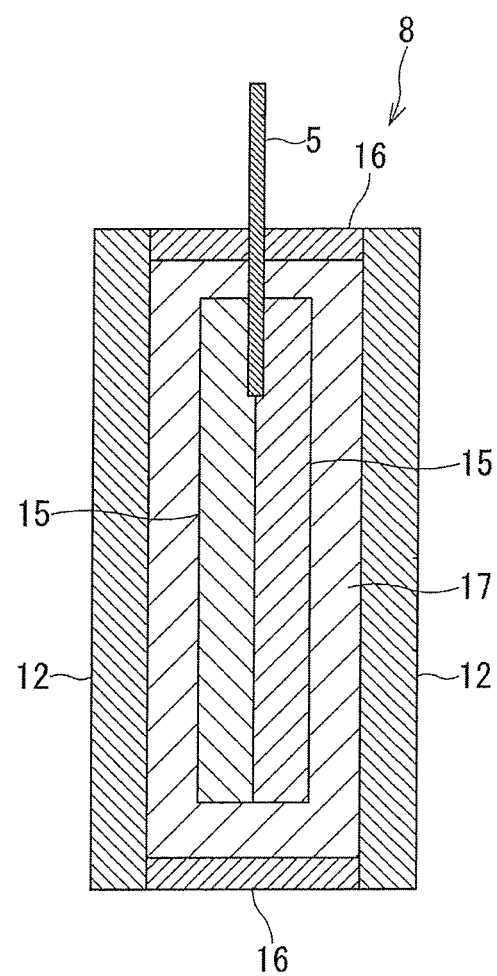
FIG. 6 is a schematic cross-sectional view illustrating the lithium anode composite of the lithium-air battery according to the other embodiment of the present invention.

FIG. 5 is a schematic perspective view illustrating a protected lithium anode composite of the lithium-air battery according to another embodiment of the present invention, and FIG. 6 is a schematic cross-sectional view of the protected lithium anode composite (merely called "anode composite") of the lithium-air battery according to the present embodiment.

As illustrated in FIGS. 5 and 6, each anode composite 8 of each of the lithium-air batteries 1 and 1A includes a plate-shaped or strip-shaped anode current collector 5, two plate-shaped anode layers 15 made from metallic lithium, an alloy primarily composed of lithium, or a compound primarily composed of lithium and arranged so as to sandwich a part of the anode current collector 5, two plate-shaped isolating layers 12 made from glass ceramics having lithium ion conductivity and arranged so as to sandwich another part of the anode current collector 5 and the whole of the two anode layers 15, and a junction portion 16 arranged so as to join and close outer peripheral portions of the two isolating layers 12, while exposing the rest of the anode current collector 5 outward between the two isolating layers 12.

In addition, each anode composite 8 is provided with a buffer layer 17 having lithium ion conductivity and adapted to separate a anode layer 15 and an isolating layer 12 from each other.

That is, each anode composite 8 has a package structure in which two anode layers 15 to be bonded together are packed with the buffer layer 17, and the buffer layer 17 is packed with two isolating layers 12 and two junction portions 16. Further, the anode current collector 5 is an electrical conductor made from copper, gold or platinum.

The two anode layers 15 have substantially the same quadrangular plate-shaped shape and bonded together with a part of the anode current collector 5 sandwiched therebetween.

Further, it is desirable to make the anode layers 15 from metallic lithium. Alternatively, the anode layers 15 may be made from an alloy primarily composed of lithium or a compound primarily composed of lithium instead of metallic lithium. The alloy primarily composed of lithium may contain any of magnesium, calcium, aluminum, silicon, germanium, tin, lead, arsenic, antimony, bismuth, silver, gold, zinc, cadmium, mercury, and the like. Examples of the compound primarily composed of lithium include $Li_{3-x}M_xN$ (M=Co, Cu or Fe).

The buffer layer 17 is a lithium ion-conducting polymer electrolyte or organic electrolyte solution. Further, it is also desirable that the lithium ion conductivity of the buffer layer 17 is $10^{-5}$ S/cm or higher.

The buffer layer 17 may be either a solid electrolyte prepared by dispersing a lithium salt into a polymer, or a gel electrolyte prepared by swelling a polymer with an electrolytic solution in which a lithium salt is dissolved.

Examples of the polymer, serving as the host of the solid electrolyte, include PEO (polyethylene oxide) and PPO (polypropylene oxide).

Examples of the polymer, serving as the host of the gel electrolyte, include PEO (polyethylene oxide), PVDF (polyvinylidene fluoride), PVDF-HFP (a copolymer of polyvinylidene fluoride and hexafluoropropylene).

Examples of the lithium salt include $LiPF_6$, $LiClO_4$, $LiBF_4$, LiTFSI ($Li(CF_3SO_2)_2N$), $Li(C_2F_4SO_2)_2N$, and LiBOB (lithium bis(oxalato)borate).

In a case where PEO, which is particularly desirable as the polymer of the solid electrolyte, is used, it is desirable that the molecular weight of PEO is $10^4$ to $10^5$, and that the molar ratio of PEO to the lithium salt is 8 to 30:1.

In order to improve the strength and electrochemical characteristics of the buffer layer 17, powder of a ceramic filler, for example BaTiO$_3$, may further be dispersed into the polymer. The amount of the ceramic filler to be mixed is desirably 1 to 20 parts by weight with respect to 100 parts by weight of the rest of constituents.

Incidentally, if the anode layers 15 and the isolating layers 12 come into contact with each other, the lithium of the anode layers 15 and the glass ceramics of the isolating layers 12 react with each other. For example, in a case where the material of the isolating layers 12 is LTAP, Ti$^{4+}$ of LTAP is reduced by lithium. Such a reaction is suppressed, however, by interposing the buffer layer 17 between the anode layers 15 and the isolating layers 12 to thereby preventing contact therebetween. This arrangement contributes to elongation of the life of the lithium-air battery 1.

As the material of the buffer layer 17, inorganic substances, such as LiI, Li$_{3N}$ and Li$_x$PO$_y$N$_z$, have also already been proposed. The buffer layer 17 can be formed by a simplified method such as doctor blade method, spin coating method, or slip casting method by adopting a polymer electrolyte for the material of the buffer layer 17. This formation or arrangement can provide advantageous effect of eliminating the need to use a sputtering deposition method, which is costly and has difficulty in treating large areas for the buffer layer 17. In addition, it is easy to change the composition of the polymer electrolyte, which contributes to improvement in the degree of design freedom.

Alternatively, the buffer layer 17 may be such that a separator (porous polyethylene or polypropylene) is impregnated with an organic electrolytic solution. In this case, the organic electrolytic solution to be used for the buffer layer 17 is prepared by mixing diethyl carbonate or dimethyl carbonate into ethylene carbonate and adding a lithium salt, such as LiPF$_6$ (lithium hexafluorophosphate), to the mixture.

The isolating layers 12 constitute almost all part of the outer shell of the anode composite 8 to thereby protect the anode layers 15 against water. That is, the two isolating layers 12 are positioned so as to face the air electrode layers 13 of different air electrodes 9.

The isolating layers 12 have a quadrangular flat plate-like shape relatively larger than the anode layers 15, and wraps the whole of the two anode layers 15 so as to be integrated with each other. That is, the central portion of each isolating layer 12 confronts one of the anode layers 15, and the outer peripheral portion of each isolating layer 12 protrudes outward from the anode layer 15 like a brim or an edge of eave. Further, it is desirable for each isolating layer to have a thickness of about 100 to 300 μm.

In addition, the isolating layers 12 are made of water-resistant and lithium ion-conducting glass ceramics. The lithium ion conductivity of the isolating layers 12 is desirably 10$^{-5}$ S/cm or higher, and each isolating layer 12 is desirably a NASICON (Na Superionic Conductor)-type lithium ion conductor. More desirably, each isolating layer 12 is a lithium ion conductor represented by the general formula Li$_{1+x}$M$_{2-x}$M'$_x$(PO$_4$)$_3$, which has the lithium ion conductivity improved by replacing a part of the quadrivalent cation M of a lithium ion conductor represented by the general formula Li$_3$M$_2$(PO$_4$) (wherein M is a quadrivalent cation, such as Zr, Ti or Ge) with a trivalent cation M', such as In or Al. Alternatively, each isolating layer 12 is a lithium ion conductor represented by the general formula Li$_{1-x}$M$_{2-x}$M''$_x$(PO$_4$)$_3$, which has the lithium ion conductivity improved by replacing a part of the quadrivalent cation M of a lithium ion conductor represented by the general formula Li$_3$M$_2$(PO$_4$) (wherein M is a quadrivalent cation, such as Zr, Ti or Ge) with a pentavalent cation M'', such as Ta. It is also desirable to replace P in these lithium ion conductors with Si. More particularly, it is desirable that each isolating layer 12 is a lithium ion conductor represented by the general formula Li$_{1+x+u}$Ti$_{2-x}$Al$_x$P$_{3-y}$Si$_y$O$_{12}$ (LTAP).

The junction portions 16 are bridged between the respective outer peripheral portions of the two isolating layers 12. The junction portions 16 close a region sandwiched by the two isolating layers 12 (rear side and bottom side in FIG. 5), and the junction portions 16 seal a partial portion of the anode current collector 5, the two anode layers 15, and the buffer layer 17 within this region in conjunction with the two isolating layers 12.

Furthermore, the junction portions 16 are made up of an epoxy resin-based adhesive agent, silicone-based adhesive agent or styrene-butadiene rubber-based adhesive agent, which is filled in a space between the outer peripheral portions of the two isolating layers 12 and then hardened.

Since the junction portions 16 are exposed to both the buffer layer 17 and the electrolyte 7, it may be preferred for the junction portions 16 to have resistance to both organic electrolyte solutions and alkalis. If a polymer electrolyte is used for the buffer layer 17, the junction portions 16 have only to have alkaline resistance.

The junction portions 16 may alternatively be made up of resin filled and hardened instead of the adhesive agent.

The lithium-air battery 1 and the anode composites 8 according to the present embodiment allow both sides of each plate-shaped anode composite 8 to contribute to electrical generation. This double-sided use of each anode composite 8 enables an area effective for cell reaction per the same volume to be increased twice as large as the area of a conventional lithium-air battery to improve an input/output density.

In addition, the lithium-air battery 1 and the anode composites 8 according to the present embodiment can eliminate the need for laminate films used in a conventional lithium-air battery, reduce the number of components, and do not require any difficult bonding at the time of joining polypropylene and glass ceramics of a laminate film.

In contrast to a conventional lithium-air battery containing an aqueous electrolyte for each unit cell in which a anode composite and an air electrode are paired, the lithium-air battery 1 and the anode composites 8 according to the present embodiment are such that a plurality of air battery cells 11 is connected in parallel and housed in one case 2, and hence, the lithium-air battery 1 and the protected lithium anode composites 8 of the present embodiment having such a structure do not require a partition for each air battery cell 11 (corresponds to an exterior package of the conventional lithium-air battery). Instead, a plurality of air battery cells 11 shares the electrolyte 7, thereby making it possible to optimize the amount of stored electrolyte 7 to thereby reduce the weight and volume of the lithium-air battery 1 as a whole.

Moreover, according to the lithium-air battery 1 and the protected lithium anode composites 8 of the present embodiment, in a case where an aqueous electrolytic solution is stored in the case 2 as the electrolyte 7, even if the electrolyte 7 vaporizes along with the progress of discharge, the electrolyte 7 is allowed to be resupplied in succession to the air electrodes 9.

Consequently, it is not required for the lithium-air battery 1 and the protected lithium anode composites 8 to be replenished or resupplied with the electrolyte 7 over a prolonged period of time, thereby preventing performance degradations due to forgetting of replenishing of the electrolyte 7.

Furthermore, in the lithium-air battery 1 and the protected lithium anode composites 8 according to the present embodiment, the two isolating layers 12 are joined by the junction portions 16. Therefore, the lithium-air battery 1 and the protected lithium anode composites 8 can be manufactured more easily than a case of where difficulty in the bonding operation is caused at the time of joining polypropylene and glass ceramics of a laminate film.

Therefore, according to the lithium-air battery 1 and the protected lithium anode composites 8 of the present embodiment, it is possible to prevent an extreme increase in the size, thereby making the battery compact compared with a conventional air battery, even if an energy density and an input/output density are increased.

What is claimed is:

1. A lithium-air battery comprising:
   a lithium anode composite; and
   an air electrode,
   wherein the lithium anode composite includes:
   a plate-shaped or strip-shaped anode current collector;
   two plate-shaped anode layers made from metallic lithium, an alloy primarily composed of lithium, or a compound primarily composed of lithium and arranged so as to sandwich a part of the anode current collector;
   two plate-shaped isolating layers made from glass ceramics having lithium ion conductivity and arranged so as to sandwich another part of the anode current collector and the whole of the two anode layers; and
   a junction provided so as to join and close outer peripheral portions of the two isolating layers with rest of the anode current collector being exposed outward between the two isolating layers, and
   wherein the air electrode includes:
   an air electrode layer containing an electroconductive material and facing at least one of the two isolating layers; and
   a plate-shaped or strip-shaped air electrode current collector electrically connected to the air electrode layer.

2. The lithium-air battery according to claim 1, wherein the air electrode includes a further air electrode layer containing an electroconductive material and electrically connected to the first-mentioned air electrode layer while being opposed to another one of the two isolating layers.

3. The lithium-air battery according to claim 1, wherein a plurality of the lithium anode composites and a plurality of air electrodes are alternately overlapped with one another to be stacked and electrically connected in parallel with one another.

4. The lithium-air battery according to claim 3, wherein the air electrode layer is folded in a zigzag manner, and each of the plurality of anode composites is sandwiched by planar portions each of which is located between folding lines of the air electrode layer.

5. The lithium-air battery according to claim 1, further comprising a case in which the lithium anode composites and the air electrodes are arranged, and an electrolyte is stored within the case in contact with at least the air electrodes to undertake lithium ion conduction between the air electrodes and the anode composites.

6. The lithium-air battery according to claim 5, wherein the case is a molded component made from a gas-permeable but liquid-impermeable material.

7. The lithium-air battery according to claim 6, wherein only the anode current collector and the air electrode current collector are exposed on the outer side of the case.

8. The lithium-air battery according to claim 1, wherein the anode current collector is made from one of copper, gold and platinum.

9. The lithium-air battery according to claim 1, wherein the air electrode current collector is made from one of aluminum, gold and platinum.

10. The lithium-air battery according to claim 1, wherein the air electrode layer is made from one of carbon cloth and carbon nonwoven cloth.

11. A lithium anode composite of a lithium-air battery comprising:
    a plate-shaped or strip-shaped anode current collector;
    two plate-shaped anode layers made from metallic lithium, an alloy composed primarily of lithium, or a compound primarily composed of lithium and arranged so as to sandwich a part of the anode current collector;
    two plate-shaped isolating layers made from glass ceramics having lithium ion conductivity and arranged so as to sandwich another part of the anode current collector and the whole of the two anode layers; and
    a junction portion provided so as to join and close outer peripheral portions of the two isolating layers with rest of the anode current collector being exposed outward between the two isolating layers.

* * * * *